April 21, 1970

R. CASSOU 3,507,281

INSTRUMENT FOR ARTIFICIAL INSEMINATION

Filed Dec. 12, 1966

ROBERT CASSOU
INVENTOR

By Wenderoth, Lind & Ponack
ATTORNEYS

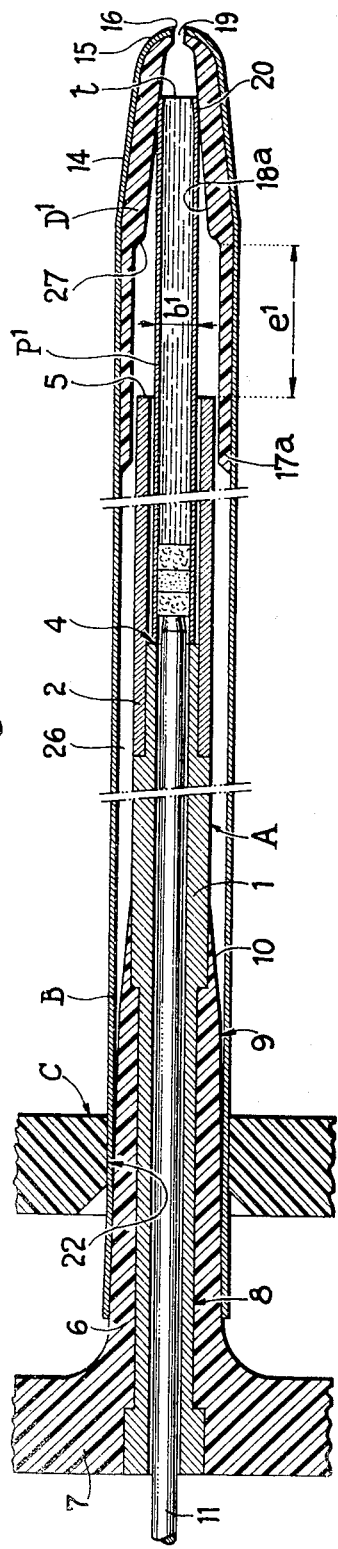
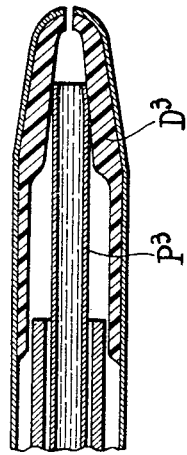
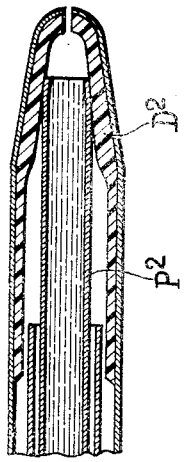
Robert Cassou
INVENTOR

United States Patent Office 3,507,281
Patented Apr. 21, 1970

3,507,281
INSTRUMENT FOR ARTIFICIAL INSEMINATION
Robert Cassou, Rue de la Merilliere 61, L'Aigle, France
Filed Dec. 12, 1966, Ser. No. 601,084
Claims priority, application France, Dec. 23, 1965,
43,471, Patent 1,467,943
Int. Cl. A61m *37/02;* A61d *7/02*
U.S. Cl. 128—235           5 Claims

ABSTRACT OF THE DISCLOSURE

An artificial insemination instrument with a semen containing straw in the forward end of a body. An axially movable plunger expels the semen from the straw. A thin protective heath with a semen injection orifice covers the body and the straw. An inner lining member having an axial throughway aperture and a frustoconical inner face is combined with the sheath. The major diameters of the frustoconical face are respectively larger and smaller than the outside diameter of the straw. The frustoconical face engages the straw so that it is possible to use a straw having a cross-sectional size which is smaller than the straw that the sheath would be capable of receiving without insertion of the lining member. This prevents any increased danger of harming the animal or the straw piercing the sheath.

---

The present invention relates to artificial insemination, at given insemination doses, and more particularly to the artificial insemination instrument disclosed in French patent specification No. 1,224,918 filed by the applicant on Feb. 4, 1959.

There has been some justified criticism for many years of the fact that insemination does not allow the breeder sufficient time to select the bull since the semina can be conserved for only two or three days.

It was also regretted that the reproducers were already dead when the knowledge of the aptitudes of their descendants classified them among the rare improvers of the species.

A complete change was brought about when cryogenic means of conservation employing very low temperatures (—196° C. of liquid nitrogen) became available.

Zoo technicians immediately drew up a plan for testing young bulls by the testing of the greatest possible number and the storage of their semina before massive utilization thereof.

The cost of the equipment and the consumption of nitrogen have induced the technicians to take an interest preferably in methods which employ perfectly identified unit doses of small outer volume which ensures high fertilization rates.

Extensive investigation has shown that the wrapping of the semen was an obstacle to the rapid freezing operations and that said wrapping must be as thin and as light as possible, the wrapping being tolerated solely for purposes of identification and ease of handling.

Straws or small tubes of plastics material occupying only two fifths of the space occupied by glass ampoules have replaced the latter in France, Belgium and in some German centres where they had already been employed for packing fresh semen.

This desire to reduce size is encouraged by the recently-known possibility of even reducing the volume of semen employed. The latter can be reduced from 1.2 cc. (long recommended) to 0.5 cc., the latter amount being confirmed by tests. It is possible to employ even less.

The foregoing has incited the applicant to produce "medium" straws or small tubes of 0.5 cc. not by modifying the length but by reducing the diameter from about 4 mm. to about 2 mm. so as to present the mass of semen in the thinnest possible form, that is, to increase the surface area of the units proportionally and considerably and tend to diminish the time delay in temperature change and the temperature differential across the section of the liquid under treatment.

The thickness of the wall of the straw has also been decreased (from about 0.2 mm. to about 0.15 mm.) so as to reduce as far as possible the mass of dead substance which hinders the freezing and entails expense in its cooling and storage.

For employing these medium straws, it was advantageous to adapt the inseminating instrument thereto. This instrument is disclosed in said patent specification.

It will here be mentioned that this instrument comprises the combination of an injecting gun having a tubular body and adapted to receive through its rigid forward end the straw or small tube containing the dose of injection and an axial plunger adapted to bear against the stopper of the straw which forms a piston, a very thin sterilized protective sheath of plastics material covering said body and provided with a narrowed forward end portion having an ejection orifice and a manual device on said gun for retaining the sheath in the course of the injection in such position that its narrowed forward end portion extends beyond the forward end of said body.

There were two possible ways of using these small or medium straws:

Firstly, to purely and simply miniaturize the gun and its sheath. The advantage of this is that the small diameter of the instrument facilitates the insemination of heifers but has a serious drawback in that the narrowed end of the instrument is too pointed and could be responsible for accidents when handling.

Secondly, to employ a normal gun and sheath and improve the assembly of the instrument so as to adapt it to straws or tubes of small diameter whose forward end face is practically incapable of bearing against the inner face of the narrowed end portion of a sheath of normal diameter.

The present invention provides a solution of said second type.

The object of the invention is to provide an insemination instrument of the type disclosed in said Patent Specification but so improved as to permit its utilization with small doses of semen (0.5 cc.–0.25 cc. for example) contained in straws having a medium or small outside diameter, namely on the order of about 2–3 mm.

The instrument according to the invention has a protective sheath which is lined in the forward end portion thereof by a removable inner lining element of plastics material for elastically maintaining the forward end of a straw or small tube containing the semen, the inner face of said lining element having on at least a portion of its length a frustoconical shape whose major and minor diameters are respectively greater and smaller than the outside diameter of the straw, the forward part of said lining element terminating in a small semen-ejecting orifice.

Owing to this lining element, the forward end of the straw is held axially perfectly well when a thrust is exerted thereon and guided laterally.

In order to ensure the perfect maintenance of the straw at the rear, in accordance with another feature of the invention, the forward part of the body of the gun comprises a thin attached tubular element for guiding the rear portion of the straw, said element having, at least in the forward portion thereof, an inside diameter equal to the outside diameter of the straw.

Further features and advantages of the invention will be apparent from the ensuing description with reference to the accompanying drawing.

In the drawing:

FIG. 3 is a partial longitudinal sectional view, on an enlarged scale, of a variant of the instrument, and FIGS. 4 and 5 are partial longitudinal sectional views of other variants.

Figure 1:
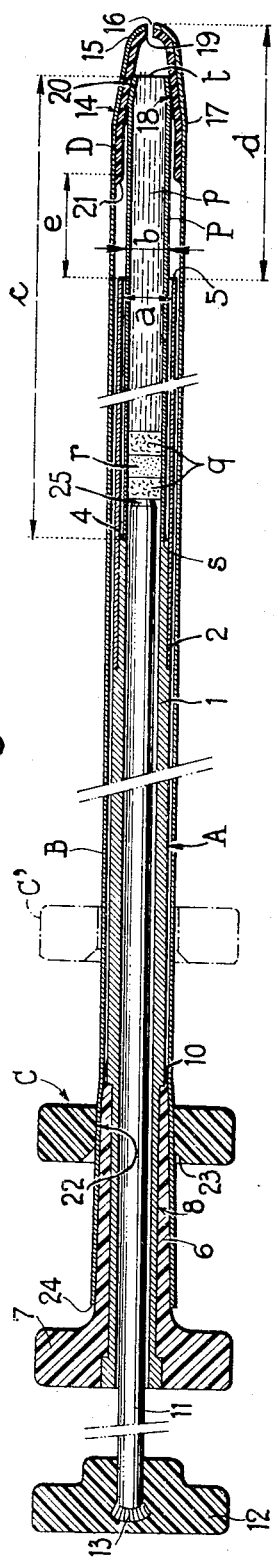
FIG. 1 is a longitudinal sectional view of the assembly of an improved injection instrument according to the invention.

The illustrated insemination instrument (FIG. 1) is adapted to receive a straw or small tube P containing the liquid semen $p$ to be injected. This straw is closed at its rear end by a plug which forms a piston and consists of the combination of two cotton wads $q$ which hold stationary a plug $r$ consisting of powder which has set hard in contact with the liquid product $p$, the rear end $s$ of the straw being open. The forward end of the straw is normally closed but is previously opened by sectioning at $t$ before its insertion into the instrument.

The injection instrument comprises (FIGS. 1 and 2) the combination of an injection gun A, a protective insulating or sealing sleeve B and a device C for retaining the sleeve B on the gun.

The gun A comprises (see FIGS. 1 and 3 relating to a first variant) a tubular metal body 1, for example of cold-drawn stainless 18/8 chromium steel. According to the invention, said body is extended forwardly by a detachable tube 2 composed of cold-drawn stainless 18/8 steel brazed to the end of the body 1 which is previously machined and gripped by said tube. The tube has an inside diameter $a$ slightly greater than the outside diameter $b$ of the straw P so as to guide the rear portion of the straw. The latter has a length $c$ (FIG. 1) which is much greater than the projection of the tube 2 from the forward end 4 of the body 1 so that when the rear end $s$ of the straw P abuts the end face 4 the straw considerably extends forwardly from the forward end 5 of the tube 2.

Further, the body 1 is provided with a reinforcing end member 6 which terminates in a flange 7. This end member is composed of rigid plastics material, for example nylon, and is moulded around the body 1 to which it is rigidly secured owing to its engagement in a long circumferential recess 8 machined in the body 1. The outer face 9 of the end member 6 is frustoconical, that is, forwardly convergent and is extended forwardly preferably by a thin lip portion 10 which has a greater conicity and merges into the body 1 which it covers over a short length (see in particular FIG. 3).

The length of the body 1 is not critical. For example, it can be on the order of 30–35 cm., its outside diameter being on the order of 4 mm. and advantageously 3.6–5.0 mm. the thickness of its wall being on the order of 0.80–1.0 mm.

The length of the chamber defined by the tube 2 is about 11–13 cm., the thickness of the wall of the tube being about 0.2 mm. The total length of the gun is therefore 40–50 cm.

As disclosed in said patent specification, the gun A also comprises a plunger consisting of a cylindrical metal rod 11 whose length is slightly greater than that of the complete instrument (body 1 plus the tube 2). The rod terminates at its rear end in an attached head 12 which is for example of plastics material, preferably nylon, and forms a push knob. This head is firmly secured to the rod 11 and the latter, in accordance with the invention, is first burred or hammered over at 13 (FI. 1) and the head 12 is subsequently moulded around the rear end of the rod.

The sheath B consists of a section of a tube of plastics material such as cellulose acetate, polyvinyl chloride, polyethylene, or superpolyamide. Its inside diameter is slightly greater than the outside diameter of the body 1, so as to allow it to be easily slipped over the latter. For example, with the aforementioned dimensions and the outside diameter of the body 1, the inside diameter of the sheath B can be 5–5.3 mm. and its thickness on the order of 0.1 mm.

At its forward end, the sheath B is narrowed at 14 in a more or less frustoconical or ogival shape, this narrowed portion being followed by a more or less frustoconical or dome-shaped end portion 15 provided with a centre orifice 16.

Figure 2:
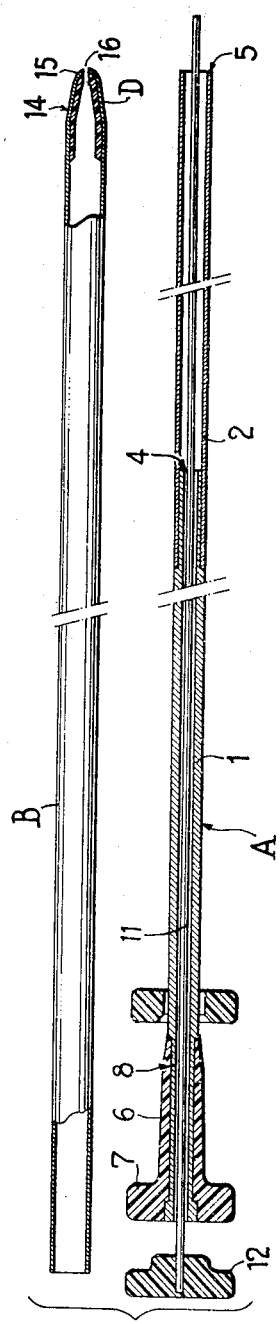
FIG. 2 shows the gun and the sheath side by side and on a reduced scale.

The sheath B is slightly longer than the body of the gun A so that with the rear end of the sheath held elastically taut on the frustoconical end 9 of the end member of the body as shown in FIG. 1, the end 5 of the gun is set back to the extent $d$ relative to the end of the sheath.

According to the invention, this sheath has an inside diameter greater than the outside diameter of the body 1 and tube 2 of the gun A and consequently much greater than that of the straw P and is lined in its forward portion with a lining element or member D of relatively rigid plastics material, such as flexible polyethylene or superpolyamide. This lining element D has an outer face which marries up with the inner face of the forward end portion of the sheath. Internally, it is provided with a throughway aperture or bore comprising a cylindrical rear portion 17 constituting a more or less long skirt, a frustoconical portion 18 which is forwardly convergent and whose major and minor diameters are respectively larger and smaller than the outside diameter $b$ of the straw, and a forward narrowed end portion provided with an ejection orifice 19 whose diameter is very slightly less than the diameter of the orifice 16 in the sheath B. The orifice 19 is small, its diameter being preferably 0.18–1 mm.

The total length of the lining element D is such that there exists after the sheath has been placed on the gun— this lining element bearing elastically against the forward end of the straw P which it constricts slightly at 20 (see also the variant on an enlarged scale shown in FIG. 3)— a free space having a length $e$ on the order of at least 1 cm. between the rear end 21 of the lining element D and the forward end 5 of the tube 2 of the gun.

The device retaining the sheath B on the gun A comprises a ring C, for example of nylon, whose inner face 22 is tapered, the included angle being preferably equal to that of the end member 6 and their taper corresponding preferably to a Morse taper No. 1. The inner face 22 is moreover countersunk at the rear at 23 so as to facilitate its engagement on the sheath which the shifting of the ring C towards the flange 7 of the end member 6 forces onto the latter.

If desired, the rear end of the sheath B starting from its rear entrance end 24, can be split into one or several V's over a short length so as to facilitate the fitting of the sheath on the end member.

The instrument according to the invention is employed in the following manner:

With the plunger (11, 12) in its withdrawn position to render accessible the interior of the portion of the tube 2 located in front of the end 4 of the body 1, the straw P, previously sectioned at $t$, is first inserted in the tube 2. The end $s$ of the straw bears against the end 4 of the body 1 so that owing to the aforementioned length it extends considerably beyond the end 5 of the tube 2.

With the straw P thus placed in position, the sterilized sheath B, which has received in its forward end the sterilized lining element D, is then slipped over the body 1.

For this purpose, the sheath B is engaged over the tube 2, then over the body 1 and finally over the end member 6 of the gun and a rearward traction is exerted thereon so as to extend it elastically and consequently cause the lining element D to abut and elastically deform the end 20 of the straw P. The sleeve is held stationary in this position by moving the retaining device C rearwardly from the position shown in dot-dash line at C' to the position shown in full line in FIG. 1.

The instrument is then ready for effecting an injection, the straw being perfectly well maintained at its forward end 20 in the lining element D and in its rear end by the fact that it is guided by the tube 2.

To effect the injection, the rod 11 of the plunger is urged forwardly. Its forward end bears against the piston-plug (q–r) of the straw P whereas the push knob 12 is then at a distance from the rear end of the flange 7 which exceeds the distance between the forward end 25 (FIG. 1) of the plunger and the forward end t of the straw P.

The instrument is then introduced into the animal to be inseminated by inserting the forward end of the sheath B. The narrowed end portion 14 having the frustoconical or ogival shape and the more or less spherical end 15 of the sheath B and of the lining element D facilitate the penetration of the forward end of the instrument. The insemination is then effected in urging the plunger 11 forwardly. This rod exerts a thrust on the piston-plug (q–r) which progressively and completely expels the semen p which is injected in the form of a stream through the orifice 19 of the lining element D and the orifice 16 of the sheath B. The hermetic contact at 20 precludes any loss of substance by the rearward flow of the semen between the straw and the sheath.

After the injection, the practitioner shifts the ring C forwardly to the position C' and this releases the sheath B. The latter is drawn forwardly off the gun and discarded. The straw P has merely to be removed from the tube 2.

The gun A from which the sheath B and the straw P have been removed is immediately ready without sterilization for a further insemination operation.

In FIG. 3, the gun is provided for insemination with a straw P¹ having an outside diameter b¹ which is less than that of the straw P shown in FIG. 1 (bearing in mind the difference in the scale of the two figures). Under these conditions, the body 1 of the gun and the tube 2 can have smaller diameters than in the embodiment shown in FIG. 1.

In this case, the end member 6 has a much greater diameter than the body 1 and the sheath B is at a much greater radial distance from the body 1 and the tube 2 than in the first embodiment (see annular clearance 26). Under these conditions, in order to suitably guide the sheath near the forward part of the gun it is very advantageous to lengthen the lining element D¹, its cylindrical skirt 17a being thinner and engaging, when the instrument is ready for insemination, the attached tube 2 over a certain length so as to suitably guide the sheath and the lining element in the forward part of the gun. The cylindrical skirt 17a extends to the inner shoulder 27 of the lining element and the distance e¹ between this shoulder and the end 5 of the tube 2 constitutes a safety margin whereby the sheath B can be put under perfect tension without this shoulder prematurely abutting the gun A when fitting the sheath over the gun. This guarantees a perfectly hermetic elastic contact at 20 between the end t of the straw P¹ and the frustoconical face 18a of the lining element D¹.

FIGS. 4 and 5 show, on the same scale as FIG. 1, an arrangement similar to that shown in FIG. 3 but with straws P² and P³ of different diameters and lining elements D² and D³ of the same type as the element D¹ of the embodiment shown in FIG. 3 but with different thicknesses. These FIGURES 4 and 5 are merely intended to show that the diameters of the various elements are in no way critical.

Although specific embodiments of the invention have been described, many modifications and changes may be made therein without departing from the scope of the invention as defined in the appended claims.

Having now described my invention what I claim as new and desire to secure by Letters Patent is:

1. In an instrument for artificial insemination comprising a gun having a body, a semen-containing straw or tube engaged in the forward end of the body, a plunger axially movable in the body for expelling the semen from the straw or tube and a very thin protective sheath covering the body and the straw or tube and having a semen ejection orifice; the feature that the sheath is combined with an inserted inner lining member closely lining the sheath and having an axial throughway aperture and an inner face which is substantially frustoconical the major and minor diameters of the frustoconical face being respectively larger and smaller than the outside diameter of the straw or tube and said substantially frustoconical face engaging said straw or tube, whereby it is possible to employ in the instrument, a semen-containing straw or tube having a cross-sectional size which is smaller than the straw or tube cross-sectional size that the sheath would be capable of receiving without insertion of the lining member, with no increased danger of harming the animal receiving the instrument or of the straw or tube piercing the sheath.

2. An instrument as claimed in claim 1, wherein the sheath has such length and the lining member such shape and dimensions that a free space is provided between the forward end of the gun body and the lining member so that the lining member cannot abut the gun body and oppose the forcing of the sheath onto the gun body before the end of the straw or tube abuts in a fluidtight manner said inner face of the lining member.

3. An instrument as claimed in claim 1, wherein a thin tubular member is mounted on the body of the gun for guiding the rear portion of the straw or tube, the tubular member having in a forward portion thereof an inside diameter which is such that the tubular member is capable of accommodating the straw or tube.

4. An instrument as claimed in claim 3, wherein the lining member is rearwardly extended by a cylindrically skirt forming a shoulder on the inner substantially frustoconical face of the lining member, the skirt having such length and diameter that, bearing in mind the length of the sheath, it engages on the forward portion of the tubular member and a free longitudinal gap exists between the end of the tubular member and the shoulder so as to enable the sheath to be stretched over the body of the gun before abutment of the tubular member against the shoulder.

5. An instrument for artificial insemination comprising a gun having a body, a cavity in the forward end of the body, a semen-containing straw of plastics material engaged in the cavity, a plunger axially movable in the body and adapted to expel semen from the straw, and a very thin protective sheath covering the body and the straw and having a semen ejection orifice in the forward end of the sheath, an inner lining member closely lining the sheath and having an axial throughway aperture and an inner face which is substantially frustoconical, the major and minor diameters of the substantially frustoconical face being respectively larger and smaller than the outside diameter of the straw and the substantially frustoconical face engaging the straw, the inside diameter of the sheath being no smaller than 5 mm. and the outside diameter of the straw not exceeding 3 mm.

References Cited

UNITED STATES PATENTS

| 899,728 | 9/1908 | Graham | 128—238 |
|---|---|---|---|
| 1,835,122 | 12/1931 | Thévenot | 128—235 |
| 2,572,155 | 10/1951 | Hoyt | 128—234 |

FOREIGN PATENTS 867,274  5/1961  Great Britain.

RICHARD A. GAUDET, Primary Examiner

M. F. MAJESTIC, Assistant Examiner

U.S. Cl. X.R.

128—260